US008891370B2

(12) United States Patent
Gunatilake

(10) Patent No.: US 8,891,370 B2
(45) Date of Patent: Nov. 18, 2014

(54) METHOD AND APPARATUS FOR TRANSMITTING A CODED VIDEO SIGNAL

(71) Applicant: Priyan Gunatilake, San Diego, CA (US)

(72) Inventor: Priyan Gunatilake, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 13/717,554

(22) Filed: Dec. 17, 2012

(65) Prior Publication Data
US 2013/0101021 A1  Apr. 25, 2013

Related U.S. Application Data

(63) Continuation of application No. 13/097,887, filed on Apr. 29, 2011, now Pat. No. 8,379,523, which is a continuation of application No. 10/935,163, filed on Sep. 8, 2004, now Pat. No. 7,983,160.

(51) Int. Cl.
*H04L 12/26* (2006.01)
*H04N 21/44* (2011.01)
*H04N 21/658* (2011.01)
*H04N 21/234* (2011.01)
*H04N 19/149* (2014.01)
*H04N 21/6377* (2011.01)

(52) U.S. Cl.
CPC ... *H04N 19/00181* (2013.01); *H04N 21/44004* (2013.01); *H04N 21/658* (2013.01); *H04N 21/23406* (2013.01); *H04N 21/6377* (2013.01)
USPC ........ 370/230.1; 370/231; 370/234; 370/252; 370/230

(58) Field of Classification Search
CPC .......... H04N 21/44004; H04N 21/658; H04N 21/6377; H04N 19/00181; H04N 21/23406
USPC ........................ 370/230.1, 231, 234, 252, 230
See application file for complete search history.

(56) References Cited

U.S. PATENT DOCUMENTS 5,517,253 A * 5/1996 De Lange ..................... 348/513
6,160,846 A   12/2000 Chiang et al.
(Continued)

OTHER PUBLICATIONS

Cheng et al, Modeling and Prediction of Session Throughput of Constant Bit Rate Streams in Wireless Data Networks, 2003, IEEE.*

(Continued)

*Primary Examiner* — Omer S Mian
(74) *Attorney, Agent, or Firm* — Fitch, Even, Tabin & Flannery LLP

(57) ABSTRACT

A method and apparatus for transmitting a digitally encoded video image in real time wherein the video image is digitally encoded using a compression algorithm having a variable bit rate, e.g., JPEG2K, to provide an encoded data stream, the encoded data stream is fed into a buffer of known size, and the data is read from the buffer via a streamer with a controllable bit rate to provide a bit stream at a desired stream bit rate for transmission. The bit rate of the encoded data stream from the encoder is monitored by a predictor and predicts a future bit rate of the encoded data stream; and, the bit rate of at least one of the encoder and the streamer is adjusted to provide the desired streaming bit rate wherein the predicting of the future bit rate is carried out using a prediction model based on a smoothed bit rate vs. time curve of the encoded data stream.

28 Claims, 2 Drawing Sheets

(56) References Cited

U.S. PATENT DOCUMENTS

| | | | |
|---|---|---|---|
| 6,269,078 B1* | 7/2001 | Lakshman et al. | 370/230 |
| 7,983,160 B2 | 7/2011 | Gunatilake | |
| 8,379,523 B2 | 2/2013 | Gunatilake | |
| 2002/0122484 A1 | 9/2002 | Mihara et al. | |
| 2002/0181597 A1* | 12/2002 | Okada | 375/240.25 |
| 2004/0223184 A1* | 11/2004 | Kusumoto et al. | 358/1.15 |
| 2009/0225864 A1* | 9/2009 | Costa et al. | 375/240.24 |

OTHER PUBLICATIONS

Office Action issued in U.S. Appl. No. 10/935,163, mailed Apr. 29, 2009, 19 pages.

Final Office Action issued in U.S. Appl. No. 10/935,163, mailed Dec. 8, 2009, 19 pages.

Office Action issued in U.S. Appl. No. 10/935,163, mailed Apr. 28, 2010, 20 pages.

Final Office Action issued in U.S. Appl. No. 10/935,163, mailed Sep. 15, 2010, 28 pages.

Notice of Allowance issued in U.S. Appl. No. 10/935,163, mailed Mar. 8, 2011, 9 pages.

Office Action issued in U.S. Appl. No. 13/097,887, mailed Jan. 4, 2012, 69 pages.

Final Office Action issued in U.S. Appl. No. 13/097,887, mailed Jun. 27, 2012, 19 pages.

Notice of Allowance issued in U.S. Appl. No. 13/097,887, mailed Oct. 12, 2012, 13 pages.

* cited by examiner

US 8,891,370 B2

METHOD AND APPARATUS FOR TRANSMITTING A CODED VIDEO SIGNAL

This application is a continuation of U.S. application Ser. No. 13/097,887 filed on Apr. 29, 2011, which is a continuation of U.S. application Ser. No. 10/935,163, filed Sep. 8, 2004, now U.S. Pat. No. 7,983,160, both of which are incorporated herein by reference.

BACKGROUND OF THE INVENTION

The present invention relates to a method and apparatus for transmitting a coded video signal in real time via a data network. More particularly, the present invention relates to a method and apparatus for transmitting an encoded digital video signal in real time via a data network wherein the encoding of the video image involves using a compression algorithm having a variable mid-rate to provide the digitally encoded data stream.

Since the mid-'90s, JPEG (Joint Photographic Export Group) is a standard that has been very widely used in the compression of digital still images. However, and more recently, the study of wavelets, particularly wavelet transformers, has led to a new compression method that is called JPEG 2000 or JPEG2K and variations thereof. Unlike the original JPEG algorithm, the JPEG 2000 or JPEG2K algorithm can be applied to both still images and to motion video.

JPEG2K allows for up to a 200-1 compression ratio with very little appreciable degradation in image quality, and has a lossy and lossless version of the image compression. The image compression and the impressive compression ratios are primarily obtained through segmentation of the video image or video frame into regions of interest (ROI's), and then applying an optimum family of wavelet transforms onto the region. However, this impressive compression capacity comes as a trade-off of implementation complexity. This has generally led to most real-time JPEG2K systems currently available to be hardwire based.

The ROI-based scheme has resulted in the JPEG2K encoding to be based on quality levels as opposed to numerical encoding bit rate levels, as seen, for example, in MPEG 2, MPEG 4, etc schemes. As a result, in a JPEG 2K system, one decides among the different quality levels available to configure the encoding process. For example, low, medium, and high can form one particular quality characterization. These categories in turn are mapped to a numerical value of the difference between the original and the JPEG2K reconstituted frame. In order to map the low, medium and high levels to the error, a metric such as Mean-Square-Error (MSE) can and often is used.

The quality-based encoding process used in JPEG2K leads to a variable bit rate encoding system. That is, the bit rate is dependent on the image or video content. For example, a scene with motion would produce a larger encoding bit rate than a scene with no motion for a given quality level. In the practical high-definition (HD) based JPEG2K systems, it is common to see the instantaneous coding rate vary from 2.4 Mbps for a still scene, to 64 Mbps for a complex scene. However, this variable bit rate poses a challenge in a streaming environment of a data network, e.g., the internet streaming environment. To accommodate the dynamic nature of the network bandwidth, most streaming systems use a constant bit rate streaming mechanism. The constant bit rate is chosen to provide the maximum likelihood of error-free transmission within the network. Streaming protocols such as RSVP are used to reserve bandwidth with such constant bandwidth streaming channels. In the above environments, the variable bit rate of JPEG2K poses a problem.

It is the general object of the present invention to control the encoding bit rate and/or the streaming bit rate so as to be better able to control the streaming bit rate within the confines of the streaming environment, while at the same time permitting maximum quality of transmission.

BRIEF SUMMARY OF THE INVENTION

The above object generally is achieved according to the present invention by a method of transmitting a coded video image in real time via a data network that comprises digitally encoding a video image using a compression algorithm having a variable bit rate to provide an encoded data stream; feeding the encoded data stream into a buffer of known size; reading data from the buffer via a streamer with a controllable bit rate to provide a bit stream at a desired stream bit rate for transmission via the network; monitoring the bit rate of the encoded data stream from the encoder and predicting a future bit rate of the encoded data stream; and, adjusting the bit rate of at least one of the encoder and the streamer to provide the desired streaming bit rate.

According to features of the present invention, the prediction is carried out using a prediction model that maps bit rate vs. time based on a second or higher order polynomial to ensure smoothness of the bit rate vs. time curve, and the encoding algorithm is a JPEG2K algorithm.

According to a further feature of the invention the relationship between the encoding and streaming bit rates is defined as follows:

With this relationship, the size of the buffer can be enlarged by an amount equal to the momentary encoded bit rate minus the momentary streaming bit rate when the streaming bit rate is set to a maximum value such that further increase would result in a buffer overflow condition.

According to one embodiment of the basic invention, the method further includes defining a set of strip-wise constant bit rate streaming levels; and the bit rate is adjusted by raising and lowering the streaming bit rate level proportionately to an increase or decrease of the predicted encoded bit rate level, using the set of step-wise streaming levels.

According to a further embodiment of the basic invention, the method further includes providing the encoding algorithm with a defined set of quality levels proportional to the encoding bit rate; and the bit rate is adjusted by decreasing the encoding quality level, and thus the encoding bit rate, if the predicted encoding bit rate is greater than a maximum streaming bit rate level. Additionally, the bit rate may be adjusting by increasing the encoding quality level, and thus the encoding bit rate, if the predicted encoding bit rate plus a given threshold value is less than the maximum streaming bit rate level, where the threshold value is an empirical number based on an analysis of representative video streams.

According to a further aspect of the invention, an apparatus for carrying out the method according to the invention basically comprises: a video encoder for encoding a video image using a compression algorithm having a variable bit rate to provide an encoded data stream; a buffer of known size connected to receive the encoded data stream; a streamer with a controllable bit rate connected to the buffer to read data from the buffer and to provide a bit stream at a desired stream bit rate for transmission via the network; a predictor monitoring the bit rate of the encoded data stream from the encoder and predicting a future bit rate of the encoded data stream; and, a control arrangement adjusting the bit rate of at least one of the encoder and the streamer to provide the desired streaming bit rate.

DETAILED DESCRIPTION OF THE INVENTION

Figure 1:
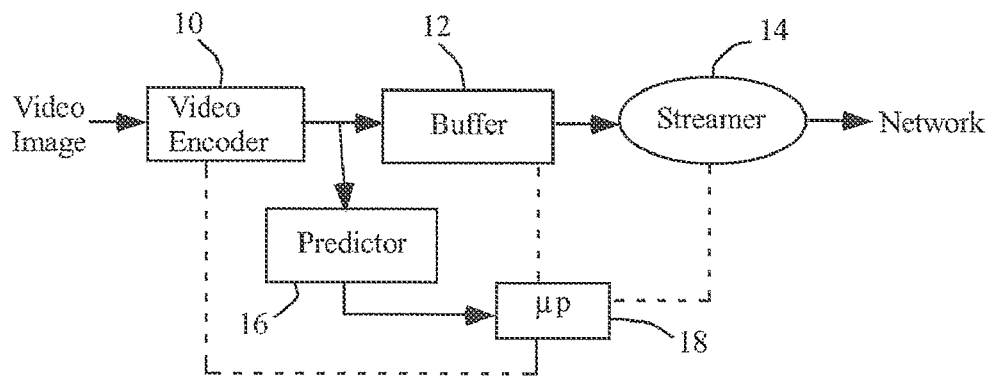
FIG. 1 is a basic block circuit diagram illustrating the streamer model as well as the control thereof.

Referring now to FIG. 1, there is shown the basic streamer model for the arrangement according to the invention for the transmission of the encoded video signal.

As shown, the video image is sent to a video encoder 10, which digitally encodes the video image using an algorithm having a variable bit rate, for example, a JPEG 2Kencoder, and has a set of defined quality levels, for example, super low, low, medium, high, super high. These quality levels will be proportional to the encoding rate. The output from the video encoder 10 is, as shown, fed to a buffer 12 which is of known size, and which operates in a conventional manner as a first-in, first out buffer, and from the buffer 12 to a streamer 14, which extracts the data from the buffer 12 and produces a data stream at a streamer bit rate dictated by the network, e.g., the internet. The output of the streamer 14 is then fed as the stream of data to the network at the streamer bit rate.

Figure 2:
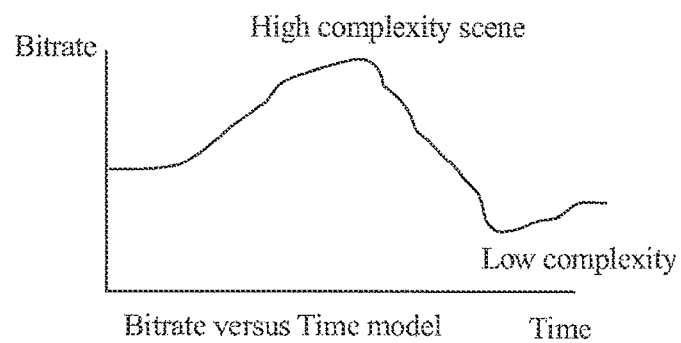
FIG. 2 illustrates a representative prediction curve of bit rate versus time for a predictor used according to the present invention.

According to the invention, a predictor 16 is provided to monitor the encoded bit stream produced by video encoder 10 and to predict the future bit rate of the bit stream. The predictor is based on the knowledge that motion content is typically smooth over time for most natural scenes. That is, there is a high content-based correlation in time between adjacent frames and this is a fundamental property that is exploited by all compression schemes. The exceptions to this rule are instances of scene changes and scene cuts, etc. However, these instances can be regarded as statistical outliers and disregarded. In general, the predictor 16 is based on a prediction model that maps bit rate versus time for the encoded video signal. The prediction model should be based on a second or higher order polynomial that ensures the smoothness of the bit rate curve, and such a curve is shown in FIG. 2. As can easily be seen, at higher complexities of the scene, the bit rate is much higher and the bit rate is at a minimum for the low to very low complexity scene.

The outpoint of the predictor is sent to a microprocessor 18, which, based on the output of the predictor 16, controls the bit rate for one or both of the video encoder 10 and the streamer 14.

According to one feature of the invention, the variable bit rate of the encoder 10 is controlled such that its maximum encoding bit rate does not exceed the maximum allowable streaming bit rate provided by the streamer 14. For this purpose, and for a given size of the buffer 12, a heuristic algorithm is used to control the bit rate of the encoder 10 as follows.

Figure 4:
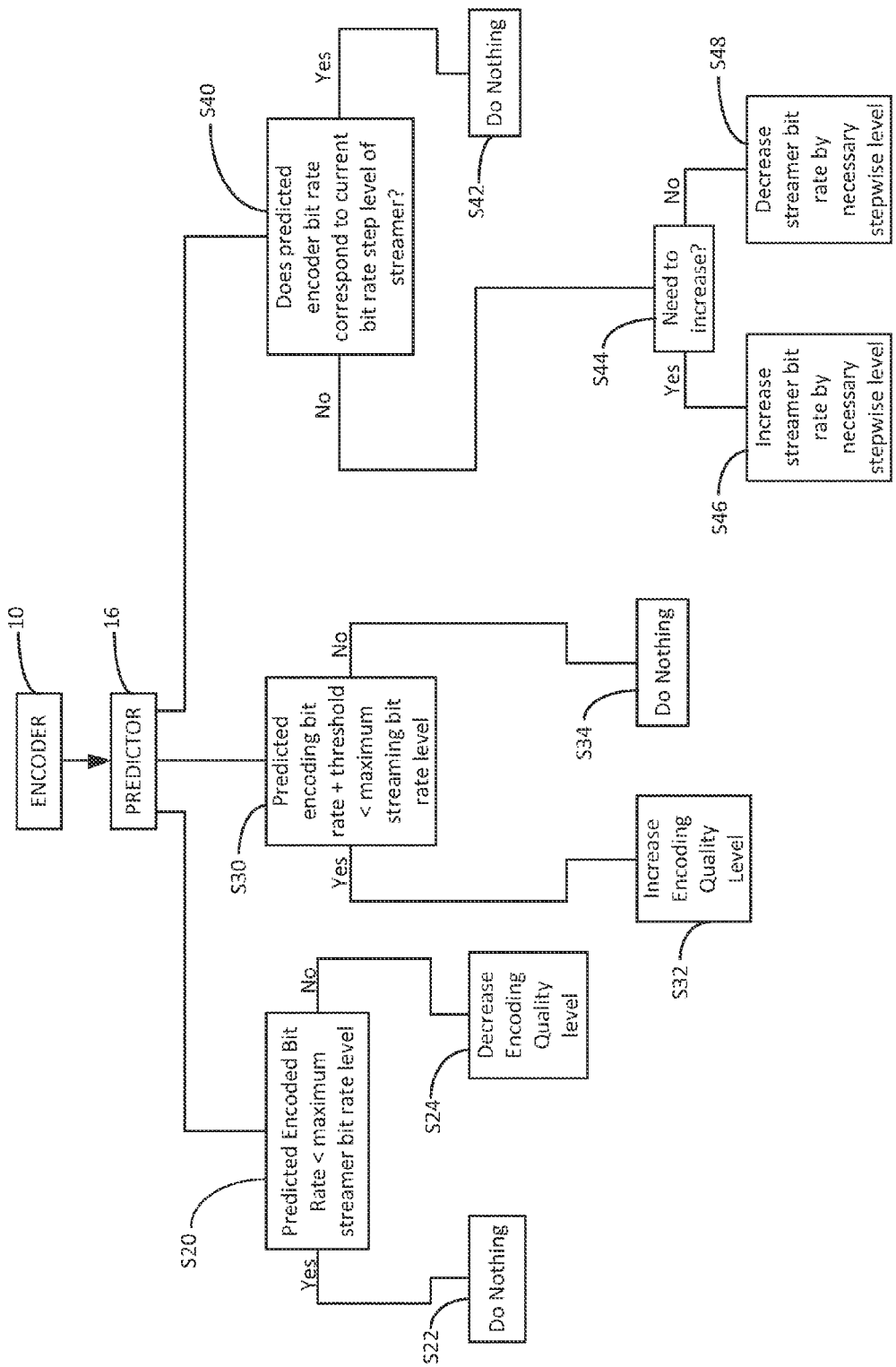
FIG. 4 is a flow diagram illustrating the operation of the method and apparatus according to the invention.

As shown in FIG. 4, if the output of the predictor 16 indicates that the predicted encoded bit rate is less than the maximum bit rate streaming level (820), nothing is done (822). That is, no further control action of the bit rate of the encoder 16 is carried out. Alternatively, if the predicted encoded bit rate is not less than the maximum, then the quality level of the encoder 10 is decreased, for example, from minimum to low (S24). Moreover, if the predicted encoding bit rate plus some threshold value is less than the maximum streaming bit rate level from the streamer 14 (830), the quality level of the encoder 10 is increased, for example, from medium to high (832). Alternatively, if the predicted encoder bit rate plus the threshold value is greater than the maximum streaming bit rate level, then no change is made to the encoder bit rate. For this purpose, the threshold value will be an empirical number based on an analysis of representative video streams. As can be appreciated, as a result of this method, the quality of the encoded picture being transmitted by the streamer can be improved.

Figure 3:
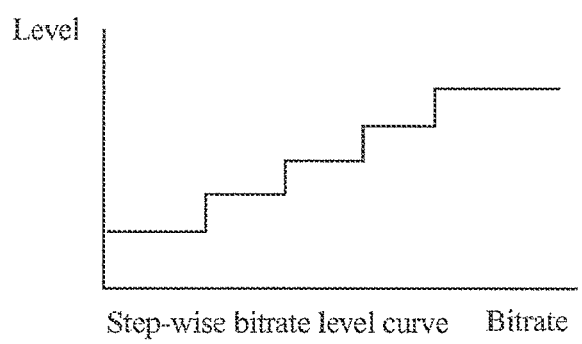
FIG. 3 is a curve showing a set of stepwise constant bit rate streaming levels defined according to the present invention.

According to a further embodiment or feature of the basic invention, a stepwise constant bit rate streaming mechanism for a variable bit rate encoding system, for example, a JPEG2K encoding system, is defined and provided as shown in FIG. 3. As with the prior embodiment, the output of the predictor 16 is utilized, but in this case is used to control the bit rate of the streamer 14 according to the stepwise bit rate curve of FIG. 3. Moreover, the behavior of the streaming model of FIG. 1 is defined according to the following relationship:

a. encoding bit rate (n)=data input to buffer (n);
    b. data in buffer (n)=data in buffer (n−1)+encoding bit rate (n)
        i. streaming bit rate (n);
    c. encoding bit rate (n)=delta (t)+streaming bit rate (t), and
    d. delta (t)=data in buffer (n)−data in buffer (n−1).

Therefore, for a buffer 12 of a given size, the streaming bit rate (n) must be controlled in a manner proportional to the encoder bit rate based on the prediction, i.e., the predicted encoder bit rate. This can be accomplished by making a decision to raise or lower the streaming bit rate level in accordance with the predicted encoder bit rate using the bit rate level curve of FIG. 3. That is, as shown in FIG. 4, a decision is made in the microprocessor 18 of whether or not the predicted encoder bit rate corresponds to the current or present streaming bit rate level (840), i.e., whether or not a change is required based on the defined behavior of the streaming model. If in the affirmative, then nothing is done for the present (842). However, if the result of 840 is a negative response, then a decision is made regarding whether an increase (or alternatively, a decrease is desired (844). If an increase is desired, then the streaming bit rate level is step increased as needed, according to the curve of FIG. 4, to the step corresponding to the predicted encoder bit rate (546). Alternatively, if a decrease in the streaming level is indicated, then the streaming bit rate level is decreased to the corresponding step level as defined by the curve of FIG. 4. (548). Moreover, in the case where the streaming bit rate cannot be increased further, Le., if set to a maximum for the data network, the buffer size can be enlarged by the microprocessor 18 by a size or amount equal to the encoder bit rate (n) minus (−) the streamed bit rate (n) in order to avoid a buffer overflow condition.

It should be noted that although each of the different methods can be utilized individually, they can, if desired, also be used simultaneously. Moreover, while the method according to the invention can be implemented by hardware, it is best implemented by software/firmware, which allows for the maximum degree of flexibility.

Finally, it should be noted that while the invention has been described for an encoder utilizing a JPEG2000 or JPEG2K compression algorithm, the invention is applicable to and can be used with any digital encoder having a compression algorithm with a variable bit rate.

It will be appreciated that the above description of the present invention is susceptible to various modifications, changes and adaptations, and the same are intended to be comprehended within the meaning and range of equivalents of the appended claims.

What is claimed is:

1. A method of transmitting a coded video image in real time via a data network comprising:
    encoding a video image using a compression algorithm having a variable bit rate to provide an encoded data stream;
    feeding the encoded data stream into a buffer of known size;
    reading data from the buffer via a streamer with a controllable bit rate to provide a bit stream at a desired stream bit rate for transmission via the network;
    monitoring the bit rate of the encoded data stream from the encoder and predicting a future bit rate of the encoded data stream based at least on a current bit rate of the encoded data stream;
    adjusting the streaming bit rate of at least one of the encoder and the streamer to provide the desired streaming bit rate; and
    defining a set of step-wise constant bit rate streaming levels;
    wherein the adjusting step includes a step selected from a group consisting of:
        raising the streaming bit rate proportionately to an increase of the predicted encoded bit rate level using the set of step-wise streaming levels; and
        lowering the streaming bit rate proportionately to a decrease of the predicted encoded bit rate level using the set of step-wise streaming levels,
    wherein the predicting step comprises presuming that a high content-based correlation in time exists between any two adjacent frames;
    wherein the presuming step comprises disregarding a statistical outlier, the statistical outlier comprising at least one element selected from a group consisting essentially of a scene change and a scene cut; and
    wherein the predicting of the future bit rate is carried out using a prediction model based on a smoothed bit rate vs. time curve of the encoded data stream.

2. The method according to claim 1, wherein the prediction model maps bit rate vs. time based on a second or higher order polynomial to ensure smoothness of the bit rate vs. time curve.

3. The method according to claim 1, wherein the encoding algorithm is a JPEG2k algorithm.

4. The method according to claim 1 further comprising enlarging the buffer size by an amount equal to the momentary encoded bit rate minus the momentary streaming bit rate when the streaming bit rate is set to a maximum value such that further increase would result in a buffer overflow condition.

5. The method according to claim 1 further including defining a relationship between the encoding and streaming bit rate as follows:
    encoding bit rate at time N=data input to buffer at time N;
    data in buffer at time N=data in buffer at time N−1+encoding bit rate at time N−streaming bit rate at time N;
    encoding bit rate at time N=delta at time N+streaming bit rate at time N; and
    delta at time N=data in buffer at time N−data in buffer at time N−1;
    wherein N is a numeric variable representing a point in time.

6. The method according to claim 1, further including providing the encoding algorithm with a defined set of quality levels proportional to the encoding bit rate; and wherein the adjusting includes decreasing the encoding quality level, and thus the encoding bit rate, if the predicted encoding bit rate is greater than a maximum streaming bit rate level.

7. The method according to claim 6, wherein the adjusting further includes increasing the encoding quality level, and thus the encoding bit rate, if the predicted encoding bit rate plus a given threshold value is less than the maximum streaming bit rate level, where the threshold value is an empirical number based on an analysis of representative video streams.

8. The method according to claim 1, further including providing the encoding algorithm with a defined set of quality levels proportional to the encoding bit rate; and wherein the adjusting includes increasing the encoding quality level, and thus the encoding bit rate, if the predicted encoding bit rate plus a given threshold value is less than the maximum streaming bit rate level, where the threshold value is an empirical number based on an analysis of representational video streams.

9. A method of transmitting a coded video signal in real time via a data network comprising:
    encoding a video signal using a compression algorithm, having a variable bit rate and a defined plurality of quality levels with corresponding differing bit rates, to provide an encoded data stream;
    feeding the encoded data stream to a buffer of known size;
    reading data from the buffer via a streamer with a controllable bit rate to provide a bit stream at a desired streaming bit rate for transmission via the network;
    monitoring the bit rate at time N of the encoded data signal and predicting a future bit rate at time N+1 of the encoded data stream based on the bit rate at time N; and,
    decreasing the encoding quality level, and thus the encoding bit rate, if the predicted encoding bit rate at time N+1 is greater than a maximum permitted streaming bit rate;
    adjusting the streaming bit rate of at least one of the encoder and the streamer to provide the desired streaming bit rate; and
    defining a set of step-wise constant bit rate streaming levels;
    wherein the adjusting step includes a step selected from a group consisting of:
        raising the streaming bit rate proportionately to an increase of the predicted encoded bit rate level using the set of step-wise streaming levels; and
        lowering the streaming bit rate proportionately to a decrease of the predicted encoded bit rate level using the set of step-wise streaming levels;
    wherein the predicting step comprises presuming that a high content-based correlation in time exists between any two adjacent frames;
    wherein the presuming step comprises disregarding a statistical outlier, the statistical outlier comprising at least one element selected from a group consisting essentially of a scene change and a scene cut;
    wherein the predicting of the future bit rate is carried out using a prediction model based on a smoothed bit rate vs. time curve of the encoded data stream; and
    wherein N is a numeric variable representing a point in time.

10. The method according to claim 9, further including increasing the encoding quality level, and thus the encoding bit rate, if the predicted encoding bit rate at a time N+1 plus a threshold value is greater than a maximum permitted streaming bit rate, where the threshold value is an empirically derived number based on an analysis of representative video signal bit streams.

11. The method according to claim 9, wherein the prediction model maps bit rate vs. time based on a second or higher order polynomial to insure smoothness of a bit rate vs. time curve.

12. The method according to claim 10, wherein the encoder algorithm is a JPEG2k algorithm.

13. A method of transmitting a coded video signal in real time via a data network comprising:
    encoding a video signal using a compress ion algorithm having a variable bit rate and a defined plurality of quality levels with corresponding differing bit rates, to provide an encoded data stream;
    feeding the encoded data stream to a buffer of known size;
    reading data from the buffer via a streamer with a controllable bit rate to provide a bit stream at a desired streaming bit rate for transmission via the network,
    monitoring the bit rate at time N of the encoded data signal and predicting a future bit rate at time N+1 of the encoded data stream based on the bit rate at time N;
    adjusting the streaming bit rate of at least one of the encoder and the streamer to provide the desired streaming bit rate; and
    defining a set of step-wise constant bit rate streaming levels;
    wherein the adjusting step includes a step selected from a group consisting of:
        raising the streaming bit rate proportionately to an increase of the predicted encoded bit rate level using the set of step-wise streaming levels; and
        lowering the streaming bit rate proportionately to a decrease of the predicted encoded bit rate level using the set of step-wise streaming levels;
    wherein the predicting step comprises presuming that a high content-based correlation in time exists between any two adjacent frames;
    wherein the presuming step comprises disregarding a statistical outlier, the statistical outlier comprising at least one element selected from a group consisting essentially of a scene change and a scene cut;
    wherein the predicting of the future bit rate is carried out using a prediction model based on a smoothed bit rate vs. time curve of the encoded data stream; and
    wherein N is a numeric variable representing a point in time.

14. The method according to claim 13, enlarging the size of the buffer by an amount equal to the encoding bit rate at a time N minus the streaming bit rate at a time N when the streaming bit rate is at a maximum level such that further increase in the streaming bit rate would result in a buffer overflow condition.

15. The method according to claim 13, further including defining a relationship between the encoding and streaming bit rates as follows:
    encoding bit rate-at time N=data input to buffer at time N;
    data in buffer at time N=data in buffer at time N−1+encoding bit rate at time N−streaming bit rate at time N;
    encoding bit rate at time N=delta at time N+streaming bit rate at time N, and
    delta at time N=data in buffer at time N−data in buffer at time N−1.

16. The method according to claim 13, wherein the prediction is carried out using a prediction model that maps bit rate vs. time based on a second or higher order polynomial to insure smoothness of a bit rate vs. time curve.

17. The method according to claim 13, wherein the encoder algorithm is a JPEG2k algorithm.

18. Apparatus for transmitting a coded video image in real time via a data network comprising:
    a video encoder for encoding a video image using a compression
    algorithm having a variable bit rate to provide an encoded data stream;
    a buffer of known size connected to receive the encoded data stream;
    a streamer with a controllable bit rate connected to the buffer to read data from the buffer and to provide a bit stream at a desired stream bit rate for transmission via the network;
    a processor device executing a set of computer-readable codes stored on a non-transitory storage medium that causes the processor device to perform the steps of:
    monitoring the bit rate of the encoded data stream from the encoder and predicting a future bit rate of the encoded data stream based at least on a current bit rate of the encoded data stream;
    adjusting the streaming bit rate of at least one of the encoder and the streamer to provide the desired streaming bit rate; and
    defining a set of step-wise constant bit rate streaming levels;
    wherein the adjusting step includes a step selected from a group consisting of:
        raising the streaming bit rate proportionately to an increase of the predicted encoded bit rate level using the set of step-wise streaming levels; and
        lowering the streaming bit rate proportionately to a decrease of the predicted encoded bit rate level using the set of step-wise streaming levels;
    wherein the predicting step comprises presuming that a high content-based correlation in time exists between any two adjacent frames;
    wherein the presuming step comprises disregarding a statistical outlier, the statistical outlier comprising at least one element selected from a group consisting essentially of a scene change and a scene cut; and
    wherein the predicting the future bit rate uses a prediction model based on a smoothed bit rate vs. time curve of the encoded data stream.

19. The apparatus according to claim 18, wherein the prediction model maps bit rate vs. time based on a second or higher order polynomial to ensure smoothness of the bit rate vs. time curve.

20. The apparatus according to claim 18, wherein the encoder algorithm is a JPEG2k algorithm.

21. The apparatus according to claim 18, wherein: the control arrangement raises and lowers the streaming bit rate proportionately to an increase or decrease of the predicted encoded bit rate level, using the set of step-wise streaming levels.

22. The apparatus according to claim 21 wherein the control arrangement enlarges the buffer size by an amount equal to the momentary encoded bit rate minus the momentary streaming bit rate when the streaming bit rate is set to a maximum value such that further increase would result in a buffer overflow condition.

23. The apparatus according to claim 21 wherein the control arrangement maintains the following defined relationship between the encoding and streaming bit rates:
   encoding bit rate at time N=data input to buffer at time N
   data in buffer at time N=data in buffer at time N−1+encoding bit rate at time N−streaming bit rate at time N;
   encoding bit rate at time N=delta at time N+streaming bit rate at time N; and
   delta at time N=data in buffer at time N−data in buffer at time N−1;
   wherein N is a numeric variable representing a point in time.

24. The apparatus according to claim 18, wherein: the encoding algorithm includes a defined set of quality levels proportional to the encoding bit rate; and the control arrangement decreases the encoding quality level and thus the encoding bit rate, if the predicted encoding bit rate is greater than a maximum streaming bit rate level.

25. The apparatus according to claim 24, wherein: the control arrangement increases the encoding quality level, and thus the encoding bit rate, if the predicted encoding bit rate plus a given threshold value is less than the maximum streaming bit rate level, where the threshold value is an empirical number based on an analysis of representative video streams.

26. The apparatus according to claim 18, wherein the encoding algorithm includes a defined set of quality levels proportional to the encoding bit rate; and the control arrangement increases the encoding quality level, and thus the encoding bit rate, if the predicted encoding bit rate plus a given threshold value is less than the maximum streaming bit rate level, where the threshold value is an empirical number based on an analysis of representative video streams.

27. Apparatus for transmitting a coded video image in real time comprising:
   a video encoder for encoding a video image using a compression algorithm having a variable bit rate to provide an encoded data stream;
   a buffer of known size connected to receive the encoded data stream;
   a streamer with a controllable bit rate connected to the buffer to read data from the buffer and to provide a bit stream at a desired stream bit rate for transmission;
   a processor device executing a set of computer-readable codes stored on a non-transitory storage medium that causes the processor device to perform the steps of:
      monitoring the bit rate of the encoded data stream from the encoder and predicting a future bit rate at a time N+1 of the encoded data stream based on the bit rate at a time N; and
      decreasing the encoding quality level, and thus the encoding bit rate, if the predicted encoding bit rate at a time N+1 is greater than a maximum permitted streaming bit rate;
      adjusting the streaming bit rate of at least one of the encoder and the streamer to provide the desired streaming bit rate; and
      defining a set of step-wise constant bit rate streaming levels;
   wherein the adjusting step includes a step selected from a group consisting of:
      raising the streaming bit rate proportionately to an increase of the predicted encoded bit rate level using the set of step-wise streaming levels; and
      lowering the streaming bit rate proportionately to a decrease of the predicted encoded bit rate level using the set of step-wise streaming levels;
   wherein the predicting step comprises presuming that a high content-based correlation in time exists between any two adjacent frames;
   wherein the presuming step comprises disregarding a statistical outlier, the statistical outlier comprising at least one element selected from a group consisting essentially of a scene change and a scene cut; and
   wherein the predicting the future bit rate uses a prediction model based on a smoothed bit rate vs. time curve of the encoded data stream.

28. An Apparatus for transmitting a coded video image in real time comprising:
   a video encoder for encoding a video image using a compression algorithm having a variable bit rate to provide an encoded data stream;
   a buffer of known size connected to receive the encoded data stream;
   a streamer with a controllable bit rate connected to the buffer to read data from the buffer and to provide a bit stream at a desired stream bit rate for transmission, the streamer further defines a set of step-wise constant bit rate streaming levels;
   a processor device executing a set of computer-readable codes stored on a non-transitory storage medium that causes the processor device to perform the steps of:
   monitoring the bit rate of the encoded data stream from the encoder and predicting a future bit rate at a time N+1 of the encoded data stream based on the bit rate at a time N; and
   adjusting the streaming bit rate of at least one of the encoder and the streamer to provide the desired streaming bit rate;
   wherein the adjusting step includes a step selected from a group consisting of:
      raising the streaming bit rate proportionately to an increase of the predicted encoded bit rate level using the set of step-wise streaming levels; and
      lowering the streaming bit rate proportionately to a decrease of the predicted encoded bit rate level using the set of step-wise streaming levels;
   wherein the predicting step comprises presuming that a high content-based correlation in time exists between any two adjacent frames;
   wherein the presuming step comprises disregarding a statistical outlier, the statistical outlier comprising at least one element selected from a group consisting essentially of a scene change and a scene cut; and
   wherein the predicting the future bit rate uses a prediction model based on a smoothed bit rate vs. time curve of the encoded data stream.

* * * * *

UNITED STATES PATENT AND TRADEMARK OFFICE
CERTIFICATE OF CORRECTION

PATENT NO. : 8,891,370 B2  
APPLICATION NO. : 13/717554  
DATED : November 18, 2014  
INVENTOR(S) : Gunatilake Page 1 of 1

It is certified that error appears in the above-identified patent and that said Letters Patent is hereby corrected as shown below:

In the CLAIMS:  
Claim 13, column 7, line 17, delete "compress ion" and insert --compression--.

Signed and Sealed this  
Twenty-eighth Day of April, 2015

Michelle K. Lee  
*Director of the United States Patent and Trademark Office*